May 30, 1950 J. H. BREWSTER, III 2,509,804
COWL FLAP
Filed May 25, 1945

INVENTOR
James H. Brewster, III.
BY H. Hume Mathson
ATTORNEY.

Patented May 30, 1950

2,509,804

UNITED STATES PATENT OFFICE 2,509,804

COWL FLAP

James H. Brewster, III, West Hartford, Conn., assignor to United Aircraft Corporation, Hartford, Conn., a corporation of Delaware Application May 25, 1945, Serial No. 595,860

10 Claims. (Cl. 123—171)

This invention relates to exit flaps for aircraft cowls and particularly to cowl flaps movable bodily from substantially streamlined positions contiguous to the trailing edge of the cowl to positions to intercept a portion of the slipstream air surrounding the cowl to aid in exhausting cooling air from within the cowl and past the flaps.

More particularly, the invention relates to an improved form of flap design, the flaps being arranged in a circular series around the trailing edge of a substantially cylindrical cowl, the flaps also having improved actuating means to simultaneously adjust them to different operative positions.

A primary object of the present invention is to provide exit flaps for a cowl, enclosing an engine or aircraft heat exchanger, movable outwardly and angularly to different oblique positions to permit air from the slipstream to motivate cooling air as it is being exahusted from within the cowl by mingling therewith and passing with the cooling air under the flaps.

Another object of the invention is to employ free stream air, energized by the plane's velocity, to impart velocity to the cooling air within a cowl as it passes from the cowl under the flaps.

Finally, it is an object of the invention to provide operating means for a series of exit flaps to bodily move the flaps simultaneously from positions substantially in alignment with the cowl surfaces radially outward and to oblique positions to permit free air from the slipstream immediately surrounding the cowl and in advance of the flaps to pass below the flaps and mingle with the air passing from the cowl, thereby increasing its velocity and increasing the mass flow of air from the space within the cowl. By means of this action substantially less drag for a given flow will result in the "stalled flap" region.

Other objects and advantages will be apparent from the specification and claims and from the drawings which illustrate what is now considered to be a preferred embodiment of the invention.

Figure 1:
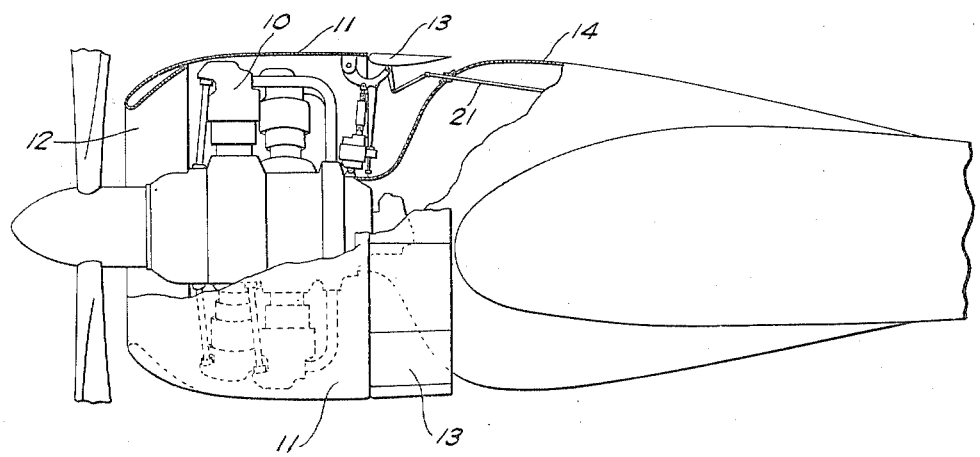
Fig. 1 is a side elevation, partly broken away, of an engine enclosed within a cowl and attached to a nacelle forming part of an airplane, exit flaps made in accordance with the present invention being shown in streamlined or closed positions.

In its preferred form the invention may include the following principal parts: first, a substantially cylindrical cowl preferably suitably streamlined at its forward end and preferably having a forward central intake opening for cooling air, the cowl illustrated being used for enclosing an aircraft engine of standard form; second, sectional exit flaps disposed in a circular series about the cowl and disposed contiguous the trailing edge of the cowl but spaced a short distance from the forward surface of the nacelle; third, a pivotally mounted supporting yoke for each flap permitting movement of the flap bodily outwardly; fourth, means preferably including a motor or motors, for moving the yokes about their pivots; and fifth, a pivotal connection between the ends of the yokes and an intermediate portion of the flaps so that in any radial position of the flaps, determined by the yoke operating motor they may be tilted to different oblique positions.

In aircraft having power plants of the air cooled type it is usual to enclose the engine of a power plant, as shown at 10, within a generally cylindrical cowl 11 having a central opening 12 at its leading edge for the intake of sufficient quantities of cooling air. Surrounding the trailing edge of the cowl 11 are cowl exit flaps 13, preferably in a circular series and disposed closely adjacent each other. The exit cowl flaps 13 in their retracted positions lie contiguous the cylindrical surface of the cowl 11 and contiguous the outer surface of the nacelle 14 directly trailing the cowl. In rear of the flaps 13 are exit openings 15 through which the cooling air is discharged into the free air-stream. In oblique and radially outward positions of the flaps 13 gaps or slots 25 are opened between the leading edges of the flaps and the trailing edge of cowl 11, admitting energized free stream air underneath the flaps, where it mixes with and energizes the slower moving cooling air, the mixture being discharged through the exit openings 15.

Figure 2:
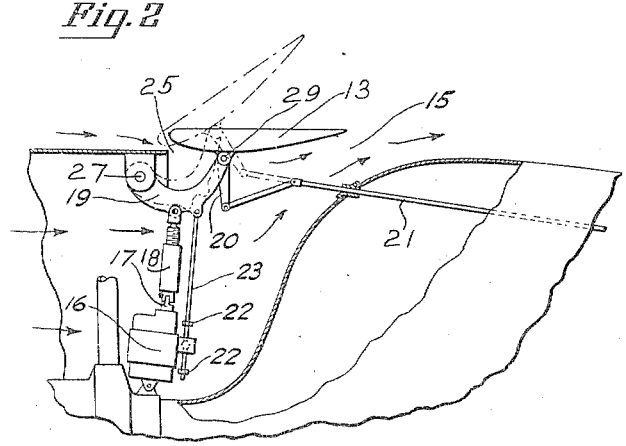
Fig. 2 is a similar view of a portion of Fig. 1, upon an enlarged scale, with the flaps in outer and oblique positions and showing more clearly the actuating means for the flaps.

Referring more in detail to Fig. 2 of the drawing, it will be seen that there have been provided a series of flaps of cambered cross-section or airfoil contour normally closely adjacent the trailing edge of the cowl 11 and adjustable from streamlined positions as shown in Fig. 1 to outer or oblique positions as shown in Fig. 2 in which air from the slipstream surrounding the cowl 11 can pass below the flaps 13 and mingle without appreciable turbulence with cooling air passing from within the cowl. It will be understood that the cowl flaps 13 may be adjusted to many different intermediate oblique and outward positions, the position shown in Fig. 1 being their closed position which is that assumed when the plane is in rapid flight. The velocity of the slipstream past the plane while in flight is sufficient to cause a substantial Venturi effect between the trailing edge of the cowl when the flaps are in tilted or radially outward positions and the adjacent surfaces of the nacelle so that under certain conditions the mass flow of cooling air from the space within the cowl is materially increased.

During a steep climb when the engine is operating at maximum capacity and the velocity of the plane is restricted the flaps 13 may be moved to an extremely oblique and radially outward position shown in dot and dash lines in Fig. 2. In the proper oblique and radial position of the flaps 13 maximum mingling of the slipstream and cooling air takes place to give minimum drag for the required maximum cooling mass flow.

In this extreme oblique position, or in any oblique or outward position, the velocity of the slipstream air which enters the slots 25 and mingles with the cooling air from within the cowl energizes the cooling air so that there is sufficient velocity of the combined streams to delay stalling of the flaps and also to augment the mass flow of cooling air from the cowl. As compared with conventional or "unslotted" cowl flaps, the special or "slotted" cowl flaps of the present invention effect a considerable drag reduction, particularly in the stalled flap region or at high flap angles, by bleeding high velocity air from the free airstream through the slots at the leading edges of the flaps into the cooling airstream.

To actuate the flaps 13 from retracted or streamlined positions to different radial outward positions a small electric motor 16 may be provided, connected with the intermediate portion of a yoke 19 by an extensible screw connection. Rotation of motor shaft 17 turns screw socket 18 to lengthen or shorten the screw connection, depending upon the direction of rotation, and thus adjusts the yoke 19 about the pivot 27 to move the flap 13 to outward or retracted positions, respectively.

As mechanism of this type is fully shown and described in reissued patent to Nissen No. 21,312 originally granted May 25, 1937, further description is not thought to be necessary. An individual operating motor 16 may be provided for each flap or, if desired, all the yokes 19 may be interconnected in a known manner, for simultaneous and equal movement. In the latter case only a single operating motor 16 for all the flaps need to be provided. Motor (or motors) 16 may be controlled by a manually actuated switch or may be controlled automatically, for instance, as disclosed in the above referred to Nissen patent.

Flaps 13 are pivoted at 29 to the rear ends of yokes 19 and may be tilted about these pivots 29 by arms 20 fixed to or formed integrally with the flaps and having their free ends attached to articulated actuating levers 21 leading to the cockpit. By means of motor or motors 16 and levers 21 the flaps 13 may be moved to any outward or tilted position within limits determined by the controlling mechanism, thus controlling both the angle of the flaps with respect to the cowl and the size of the gaps 25 between the flaps and the cowl. As shown in Fig. 2 stops 22 on rod 23 pivotally attached to yoke 19 actuate limit switches in the manner disclosed in the Nissen patent referred to above to limit the movements of the yokes 19 and the flaps 13. Also as the controls for tilting the flaps 13 about their pivotal connections with the yokes 19 at 29 are independent of the means for moving the flaps outward by motors 16, the flaps 13 can assume any oblique position while in any outward position. Levers 21 may be actuated individually or, if desired, may be attached to a common control handle (not shown) for simultaneously tilting all the flaps about the pivots 29.

It is to be understood that the invention is not limited to the specific embodiment herein illustrated and described, but may be used in other ways without departing from the spirit of the invention as defined by the following claims.

I claim:

1. An exit flap construction for aircraft heat exchangers comprising in combination, a duct member, a series of exit flaps adjacent its trailing edge, means to move said flaps radially, and other means independently controlled for tilting said flaps to oblique positions.

2. An exit flap operating mechanism comprising an annular series of flaps adjacent the trailing edge of a cowl, yokes pivotally connected at one end to said cowl and at their opposite end to said flaps, means to actuate said yokes to simultaneously move said flaps, and supplemental means to tilt said flaps to variable oblique angles in any position determined by said yokes.

3. An exit flap operating mechanism comprising an annular series of flaps adjacent the trailing edge of a cowl, yokes pivotally connected at one end to said cowl and at their opposite end to said flaps, power means to actuate said yokes to simultaneously move said flaps, and supplemental means to tilt said flaps to variable oblique angles in any position determined by said yokes.

4. An exit flap operating mechanism comprising an annular series of flaps adjacent the trailing edge of a cowl, yokes pivotally connected at one end to said cowl and at their opposite end to an intermediate portion of said flaps, means to actuate said yokes to simultaneously move said flaps radially outward relative to the cowl, and supplemental means to tilt said flaps to variable oblique angles while in any position determined by said yokes.

5. A cooling construction for air-cooled aircraft engines comprising, a cowl surrounding an engine for confining a flow of air thereover, a fairing for directing the flow of air out of said cowl, said fairing being spaced from said cowl, a cowl exit flap adjacent said cowl, a flap support for said flap, said flap being pivotally mounted on its support at an intermediate point of said flap between its leading and trailing edges, and means for pivoting said flap to different angular positions, said flap forming an opening adjacent its leading edge and said cowl which varies in size with the different angular positions, said flap forming an opening adjacent its trailing edge and said fairing which varies in size with the different angular positions.

6. A cooling construction for air-cooled aircraft engines comprising, a cowl surrounding an engine for confining a flow of air thereover, a fairing for directing the flow of air out of said cowl, said fairing being spaced from said cowl, a cowl exit flap adjacent said cowl, a flap support for said flap, said flap being pivotally mounted on its support at an intermediate point of said flap between its leading and trailing edges, and means for pivoting said flap to different angular positions, said flap forming an opening adjacent its leading edge and said cowl which varies in size with the different angular positions, said flap forming an opening adjacent its trailing edge and said fairing which varies in size with the different angular positions, said means including a lever arm attached to said flap and an actuating rod connected to said lever.

7. A cooling construction for air-cooled aircraft engines comprising, a cowl surrounding an engine for confining a flow of air thereover, a fairing for directing the flow of air out of said cowl, said fairing being spaced from said cowl, cowl exit flaps adjacent said cowl, a flap support for each of said flaps, each of said flaps being pivotally mounted on its support at an intermediate point of each of said flaps between its leading and trailing edges, and means for pivoting each of said flaps to different angular positions, each of said flaps forming an opening adjacent its leading edge and said cowl which varies in size with the different angular positions, each of said flaps forming an opening adjacent its trailing edge and said fairing which varies in size with the different angular positions.

8. An exit flap construction for aircraft heat exchangers comprising in combination, a circular cowl having an intake opening and a flap controlling an exit opening at its trailing end, a member movable in a radial direction with respect to said cowl, said flap being bodily connected to said movable member for radial movement therewith, said leading and trailing edges of said flap moving therewith, and means to effect movement of said movable member.

9. An exit flap construction for aircraft heat exchangers comprising in combination, a cowl having an intake opening and a flap controlling an exit opening at its trailing end, a yoke pivotally connected at one end to said cowl, said flap being bodily connected to the other end of said yoke for movement therewith, said leading and trailing edges of said flaps movable therewith, and means to rotate said yoke about its pivotal connection to said cowl.

10. An exit flap construction for aircraft heat exchangers comprising in combination, a circular cowl having an intake opening and flaps controlling an exit opening at its trailing end, a member movable in a radial direction with respect to said cowl, said flap being bodily connected to said movable member for radial movement therewith, said leading and trailing edges of said flaps moving therewith, and means to effect movement of said movable member.

JAMES H. BREWSTER, III.

REFERENCES CITED

The following references are of record in the file of this patent:

UNITED STATES PATENTS

| Number | Name | Date |
|---|---|---|
| 1,464,765 | Junkers | Aug. 14, 1923 |
| 1,802,915 | Hicks | Apr. 28, 1931 |
| 2,076,232 | Goodman et al. | Apr. 6, 1937 |
| 2,098,947 | Fedden et al. | Nov. 16, 1937 |
| 2,175,535 | Mercier | Oct. 10, 1939 |
| 2,206,417 | Mercier | July 2, 1940 |
| 2,319,463 | Lear | May 18, 1943 |

FOREIGN PATENTS

| Number | Country | Date |
|---|---|---|
| 484,300 | Great Britain | May 2, 1938 |